Patented Jan. 4, 1927.

1,613,219

UNITED STATES PATENT OFFICE.

JEAN HENRY BRÉGEAT, OF PARIS, FRANCE, ASSIGNOR TO BREGEAT CORPORATION OF AMERICA, OF WILMINGTON, DELAWARE, A CORPORATION OF DELAWARE.

RECOVERY OF VOLATILE ORGANIC SOLIDS.

No Drawing. Application filed June 20, 1921, Serial No. 479,149, and in France March 19, 1920.

There is on file in the United States, application for Patent Serial No. 431,526, filed December 17, 1920, entitled Process for the recovery of camphor and naphthalene contained in gaseous mixtures. In said application there is described a process for the recovery of vapors of camphor and naphthalene contained in gaseous mixtures, by treating with an absorbent consisting essentially of phenolic bodies, such as carbolic acid or cresylic acids or both. After distilling off volatile liquid solvents, and preferably after repeating the absorption and the distilling off of volatile solvents a number of times, the phenolic liquid becomes charged with camphor, say up to 10%, more or less.

Then follows a separation of the absorbent and absorbed volatile organic solid products; (a) as by injecting steam which allows the extraction of almost the entire amount of camphor and/or naphthalene; or, (b) as by precipitation with caustic alkali which results in the formation of alkali phenolates soluble in water and the precipitation of the camphor and/or naphthalene.

In said prior United States application it is shown that in the treatment of gaseous mixtures from celluloid plants one can recover vapors of the camphor and vapors of the liquid solvents, such as ether, alcohol, acetone, amyl acetate, etc., and by subsequent indirect heating of the absorbent containing the absorbed vapors, the liquid solvents are driven off completely with only a small part of the camphor (slightly volatile organic solid) with the result that as the absorbent is used again and again, it ultimately becomes charged with camphor, up to about 10% of its weight. At this stage, the viscosity of the absorbent liquid has considerably increased (from the original).

There is referred to in said application the recovery of the camphor and the regeneration of the phenolic absorbent. The elimination of the camphor is best effected by treating the camphor-laden absorbent (after the liquid solvents have been more or less driven off) with caustic soda, thus throwing out or precipitating the camphor—the soda and the absorbent combining to form the sodium salts, as above indicated. In said application there is also suggested that the sodium salts may be employed as a disinfectant, or may be regenerated by treatment with an acid; or better with an acid salt, like sodium bisulphate. My further tests and experiments have shown that in the regeneration process just referred to, carbonic acid (carbonic acid gas) can conveniently be used in place of both (a) acids (such as the waste residual acids from the manufacture of nitrocellulose, nitroderivatives, etc.); and (b) the acid salts such as bisulphate of soda.

The present invention thus depends upon the employment of carbonic acid (under which term I also include carbon dioxid) at this place and for the purpose just indicated. In performing the invention carbonic acid— carbonic acid gas—(carbon dioxid) coming as from furnaces or from other sources, is caused by any suitable means to come into intimate contact, as by bubbling, or scrubbing, with the aqueous solution of the sodium salt of the phenolic absorbent, liberating the absorbent, and this allows for the subsequent reemployment of the absorbent for absorption purposes and also gives rise to the formation of an aqueous solution of sodium carbonate. This carbonate solution can be utilized to obtain solid sodium carbonate; or, again it may be made into caustic soda by proper treatment.

By conversion of the by-product solution of sodium carbonate into caustic soda there is in effect regenerated the caustic soda which is used in the transformation of the phenolic absorbent into its sodium salt and which transformation permits the entrainment, the carrying over either mechanically or in vapor form, the sweeping out of the mass, or the separating and carrying up to the surface of the mass, of camphor by steam. In other words, the use of carbonic acid, to wit, carbonic acid gas—which (particularly in the dilute state in which it may be used) is a common and cheap product—liberates the phenolic absorbent and produces sodium carbonate and this followed by a subsequent causticizing of the sodium carbonate leads to a continuous cycle which develops in such a way as to successively recover the more costly products; that is to say, camphor, phenolic absorbent, and finally soda, and this by consuming a cheap and very common product like limestone. The use of carbonic acid also offers the advantage of not necessitating the handling and storing of containers holding acids.

It will be manifest that the existence of containers holding acids, in places such as those for the manufacture of celluloid and similar plastic materials—smokeless powder containing camphor for example—can give rise to accidents or at least to trouble. Moreover, the volumes of products to be treated are, all things equal, reduced about one-half by the use of carbonic acid and the use of this acid also allows the effecting of the operations of the regeneration of the phenolic absorbent in iron, cement or tarred wooden tanks, which are relatively cheap, compared to lead-lined tanks which would generally be used in treating the phenate solutions with sulfuric or like acid.

What I claim is:

1. In the recovery of camphor, the steps of precipitating camphor in an alkali metal phenolate solution, separating camphor from said solution and treating said solution with carbon dioxid, to regenerate a phenolic body.

2. In a process for the recovery of volatile liquid solvents and camphor wherein there is used a phenolic liquid as absorbent, such absorbent being used again and again for absorbing such liquid solvents and camphor, and from which the absorbed liquid solvents are successively eliminated after each absorbing operation, and a part only of which camphor is subsequently eliminated, the improvement which comprises regenerating the absorbent for repeated use in the process by treating it with caustic alkali, which effects precipitation of the camphor and the conversion of the phenolic bodies into alkali metal salts thereof, removing the salts, and subjecting the same when in an aqueous solution to the action of a reagent containing carbon dioxid until the phenols are set free in a state suitable for reemployment in the absorption process.

3. A process for the recovery of volatile solvents wherein there is utilized an absorbent phenolic liquid that is repeatedly used for absorbing the solvents and from which the absorbed volatilized normally liquid solvents are eliminated and which process is employed for the recovery of camphor vapors mixed with vapors of volatile solvents to be recovered, some of which camphor is subsequently eliminated but part of which remains as a contaminating agent in the absorbent liquid even after said eliminating operation, which process is characterized by the regeneration of the absorbent liquid to permit its repeated use in the process; by treating the phenolic absorbent containing camphor with a caustic alkali solution which effects a throwing out of the camphor and the conversion of the phenols in the absorbent into alkali metal salts of the phenols, treating with steam to cause the separation of camphor, subjecting said salts of the phenols, in aqueous solution, to the action of carbon dioxid until the phenols are liberated, whereby the latter can be reused in the process.

4. A process for the recovery of volatile solvents wherein there is utilized phenolic absorbent liquid that is used again and again for absorbing the solvents and from which the absorbed volatile liquid solvents are eliminated, after each absorbing operation, and which process is employed for the recovery of camphor vapors mixed with the vapors of liquid volatile solvents to be recovered, some of which camphor is subsequently eliminated from the absorbent, but part of which remains in the absorbent liquid even after the distilling operation, which process is characterized by the regeneration of the absorbent to permit its repeated use in the process; such regeneration comprising treating with alkali hydroxide solution, thus effecting a throwing out of the camphor and the conversion of the phenols in the liquid into soluble salts thereof, and subsequently separating said camphor from the said salts, and treating the liquid residue with $CO_2$.

5. The repeated employment of phenols for the recovery of mixed vapors of volatile solvents and camphor by a process involving the absorbing of the mixed vapors by phenols, the subsequent subjecting of the absorbent to distillation in a manner to drive off the absorbed volatile solvents and also some of the absorbed camphor, repeating said cycle of operation until it is advisable to regenerate the absorbent and after distillation then treating the absorbent with an aqueous solution of caustic soda until the sodium phenolates are formed and the camphor is precipitated, injecting steam into the resultant mass and separating the camphor out of the sodium phenolates, withdrawing the sodium phenolates, subjecting an aqueous solution thereof to intimate contact with carbonic acid gas until the phenols are freed or liberated, and subsequently reintroducing the freed phenols into the process for further and repeated use.

6. The repeated employment of phenols for the recovery of camphor vapors by a process which includes the absorbing of the vapors by phenols, thereafter subjecting the phenols to a distilling operation which drives off a part only of the absorbed camphor, and continuing and repeating the cycle until it is advisable to specially treat the phenols, for the separation of camphor which special treatment is carried out after a distilling operation and before a succeeding absorption operation, and involves subjecting the phenols to the action of an aqueous solution of caustic alkali until alkali metal phenolates are formed and until the camphor therein is precipitated, injecting steam into the resulting mass and separating out the camphor, withdrawing the alkali metal phenolates and subjecting a solution thereof to the action of carbonic acid until the phenols are freed or liberated, which process also includes subsequently introducing the treated phenols into the process for further and repeated use.

7. The repeated employment of phenolic absorbent bodies for the absorption of vapors of volatile organic solid from gaseous mixtures by a process involving alternately absorbing vapors by the phenolic absorbent bodies, and distilling off from the absorbent a part of said absorbed volatile organic solid, and continuing said steps until the absorbent contains a substantial percentage of said volatile organic solid, treating the absorbent by caustic alkali to form a phenolate and to precipitate the volatile organic solid, separating the volatile organic solid from the phenolate, regenerating the phenolic absorbent from the phenolate by treatment with a fluid containing carbon dioxid, and returning the regenerated absorbent in the process.

8. The repeated employment of absorbent bodies having phenolic functions for the obtaining or recovering of vapors of volatile organic solids from gaseous mixtures by a process involving the absorbing of the vapors by the absorbent bodies having phenolic functions followed by a distilling from the absorbent of a part only of the absorbed volatile organic substance and the continuance of the use of said absorbent in the repeating of the steps above recited, the treating of the absorbent by a solution of caustic soda in a manner to form sodium phenolates from the phenols in the absorbent and the throwing out of the absorbed volatile organic substances, the separating of the volatile organic substances and the sodium phenolates, the subsequent regeneration of the phenolates by the utilization of carbonic acid in a manner to effect a liberation of the phenols and again, in the process, employing the phenols which impart to the absorbent the phenolic functions.

9. The process of separating camphor from phenols involving the treatment of the phenols containing camphor with an aqueous solution of caustic fixed alkali until alkali phenolates are formed, and until the camphor therein is precipitated, injecting steam into the resulting mass and separating out the camphor, and carbonating the resulting liquid.

10. A process which comprises treating a solution of a phenolic body containing dissolved slightly volatile organic solid in solution, with caustic alkali, to precipitate said solid and to form a water-soluble salt of the phenolic body, and thereafter treating such water-soluble salt with a reagent containing carbon dioxid.

11. In the recovery of camphor, the steps of precipitating camphor in an alkali metal phenolate solution, separating said camphor from said solution by steam distillation, and thereafter treating said solution with carbon dioxid.

Specification signed this 1st day of June A. D., 1921.

JEAN HENRY BRÉGEAT. [L. S.]